(12) United States Patent
Lee et al.

(10) Patent No.: US 12,206,445 B2
(45) Date of Patent: Jan. 21, 2025

(54) TRANSCEIVER AND OPERATING METHOD THEREOF

(71) Applicant: SAMSUNG ELECTRONICS CO., LTD., Suwon-si (KR)

(72) Inventors: Namyoon Lee, Pohang-si (KR); Hyowon Lee, Pohang-si (KR)

(73) Assignees: SAMSUNG ELECTRONICS CO., LTD., Suwon-si (KR); POSTECH RESEARCH AND BUSINESS DEVELOPMENT FOUNDATION, Pohang-si (KR)

( * ) Notice: Subject to any disclaimer, the term of this patent is extended or adjusted under 35 U.S.C. 154(b) by 372 days.

(21) Appl. No.: 17/862,756

(22) Filed: Jul. 12, 2022

(65) Prior Publication Data

US 2023/0155624 A1  May 18, 2023

(30) Foreign Application Priority Data

Nov. 12, 2021   (KR) .................. 10-2021-0155771
Jan. 19, 2022   (KR) .................. 10-2022-0007892

(51) Int. Cl.
    *H04B 1/50*   (2006.01)
    *H04B 1/10*   (2006.01)
    (Continued)

(52) U.S. Cl.
    CPC ............ *H04B 1/50* (2013.01); *H04L 5/0007* (2013.01)

(58) Field of Classification Search
    None
    See application file for complete search history.

(56) References Cited

U.S. PATENT DOCUMENTS 6,721,349 B1 * 4/2004 Willenegger .......... H04B 1/707
                                                    375/130
6,970,518 B2 * 11/2005 Kuffner ................ G06K 7/0008
                                                    375/259

(Continued)

FOREIGN PATENT DOCUMENTS

CN            1572079 A  *  1/2005  .......... H04B 1/7093
KR     1020080097621        11/2008

(Continued)

OTHER PUBLICATIONS

Jungyeon Kim, et al., "Adaptive Non-Linear Digital Self-Interference Cancellation for Full-duplex Wireless Systems Using Ito-Hermite Polynomials", 2018, IEEE.

(Continued)

*Primary Examiner* — Pablo N Tran
(74) *Attorney, Agent, or Firm* — F. Chau & Associates, LLC (57) ABSTRACT

A transceiver includes a transmitter up-converting a frequency of input data to transmit data of a first frequency, an orthogonal basis generator receiving the input data from the transmitter to generate an orthogonal basis; and a receiver receiving the orthogonal basis from the orthogonal basis generator and receiving the transmitted data for down-converting a frequency of the received data to a second frequency different from the first frequency. The orthogonal basis generator includes, a multiplier multiplying the input data by a Gaussian characteristic value obtained by extracting a Gaussian characteristic of the data to generate an out of band emission (OOBE) value, and a polynomial block generating the orthogonal basis by using the OOBE value as an input to an Itô-Hermite polynomial.

20 Claims, 6 Drawing Sheets

(51) Int. Cl.
*H04L 5/00* (2006.01)
*H04L 25/03* (2006.01)
*H04L 27/36* (2006.01)

(56) References Cited

U.S. PATENT DOCUMENTS

| | | | | |
|---|---|---|---|---|
| 8,804,871 | B2 | 8/2014 | Rimini et al. | |
| 9,485,127 | B2 * | 11/2016 | Huang | H04L 27/2618 |
| 10,084,541 | B2 * | 9/2018 | Ashrafi | H04J 14/00 |
| 10,236,922 | B2 | 3/2019 | Choi et al. | |
| 11,050,468 | B2 * | 6/2021 | Perlman | H04B 7/0626 |
| 11,751,229 | B2 * | 9/2023 | Lee | H04B 1/0475 |
| | | | | 370/329 |
| 2008/0104158 | A1 | 5/2008 | Farhoodfar et al. | |
| 2014/0064405 | A1 * | 3/2014 | Shi | H04L 27/2634 |
| | | | | 375/296 |
| 2019/0141713 | A1 * | 5/2019 | Cimpu | H04W 72/541 |
| 2021/0119652 | A1 | 4/2021 | Pratt et al. | |
| 2024/0097956 | A1 * | 3/2024 | Ksairi | H04L 27/2639 |

FOREIGN PATENT DOCUMENTS

| | | |
|---|---|---|
| KR | 1020100031954 | 3/2010 |
| WO | 2006068635 | 6/2006 |

OTHER PUBLICATIONS

Jungyeon Kim et al., "Demo: Real-Time Implementation of Optimal Nonlinear Self-Interference Cancellation for Full-Duplex Ratio", 2022 IEEE International Conference on Communications Workshops.

Christopher Mollen et al., "Spatial Characteristics of Distortion Radiated From Antenna Arrays With Transceiver Nonlinearities", IEEE Transactions on Wireless Communications, vol. 17, No. 10, Oct. 2018.

Mariem Kallel Smaoui et al., "Selection of a Closed-Form Expression Polynomial Orthogonal Basis for Robust Nonlinear System Identification", J Sign Process Syst (2015) 81:285-303.

ESR dated Mar. 24, 2023 in corresponding EP Application No. 22 198 511.2.

First Office Action dated Apr. 5, 2023 in corresponding EP Application No. 22 198 511.2.

Andreas Gebhard, et al. "Adaptive Self-Interference Cancellation in LTE-A Carrier Aggregation FDD Direct-Conversion Transceivers", 016 IEEE Sensor Array and Multichannel Signal Processing Workshop (SAM), 1-5, Sep. 19, 2016.

Adnan Kiayani et al., "Digital Suppression of Power Amplifier Spurious Emissions at Receiver Band in FDD Transceivers", IEEE Signal Processing Letters, vol. 21, No. 1, Jan. 2014, pp. 69-73.

* cited by examiner

TRANSCEIVER AND OPERATING METHOD THEREOF

CROSS-REFERENCE TO RELATED APPLICATION

This U.S. non-provisional patent application claims priority under 35 U.S.C. 119 to Korean Patent Application No. 10-2021-0155771 filed on Nov. 12, 2021 in the Korean Intellectual Property Office and Korean Patent Application No. 10-2022-0007892 filed on Jan. 19, 2022 in the Korean Intellectual Property Office, the disclosures of which are incorporated by reference in their entireties herein.

1. TECHNICAL FIELD

The present disclosure relates to a transceiver and an operating method thereof.

2. DISCUSSION OF THE RELATED ART

Orthogonal frequency-division multiplexing (OFDM) is a technology that may be used for next-generation communication including long-term evolution (LTE), which is used to mobile, fixed, and portable broadband access. In OFDM, multiple closely spaced orthogonal subcarrier signals with overlapping spectra are transmitted to carry data in parallel.

However, in OFDM, there is a large out-of-band emission (OOBE) phenomenon in which a signal flows into an adjacent channel. Accordingly, a guard band may be used to reduce an influence of interference between adjacent channels. However, the guard band uses an empty frequency band, and thus, efficiency may be decreased when using OFDM.

SUMMARY

At least one embodiment of the present disclosure provides a transceiver in which an out-of-band emission (OOBE) phenomenon is decreased.

At least one embodiment of the present disclosure provides an operating method of a transceiver in which an OOBE phenomenon is decreased.

According to an embodiment of the present inventive concept, there is provided a transceiver including, a transmitter up-converting a frequency of input data to transmit data of a first frequency, an orthogonal basis generator receiving the input data from the transmitter to generate an orthogonal basis; and a receiver receiving the orthogonal basis from the orthogonal basis generator and receiving the transmitted data for down-converting a frequency of the received data to a second frequency different from the first frequency. The orthogonal basis generator includes, a multiplier multiplying the input data by a Gaussian characteristic value obtained by extracting a Gaussian characteristic of the input data to generate an out of band emission (OOBE) value, and a polynomial block generating the orthogonal basis by using the OOBE value as an input to an Itô-Hermite polynomial.

According to an embodiment of the present inventive concept, there is provided a transceiver up-converting a frequency of input data to transmit data of a first frequency, and down-converting the first frequency to a second frequency different from the first frequency and receiving data having the second frequency. The transceiver includes an orthogonal basis generator receiving the input data. The orthogonal basis generator includes, a multiplier multiplying the input data by a Gaussian characteristic value obtained by extracting a Gaussian characteristic of the data to generate an OOBE value, and a polynomial block generating the orthogonal basis by using the OOBE value as an input to an Itô-Hermite polynomial.

According to an embodiment of the present inventive concept, there is provided an operating method of a transceiver. The method includes, up-converting a frequency of input data to transmit data of a first frequency, through a transmitter, generating an orthogonal basis based on the input data received from the transmitter through an orthogonal basis generator, and receiving the orthogonal basis from the orthogonal basis generator and the transmitted data to downscale a frequency of the transmitted data to a second frequency different from the first frequency, through a receiver. The generating of the orthogonal basis includes multiplying the input data by a Gaussian characteristic value obtained by extracting a Gaussian characteristic of the data to generate an OOBE value, through a multiplier in the orthogonal basis generator; and generating the orthogonal basis by using the OOBE value as an input to an Itô-Hermite polynomial, through a polynomial block in the orthogonal basis generator.

BRIEF DESCRIPTION OF THE DRAWINGS

The above and other aspects and features of the present disclosure will become more apparent by describing in detail exemplary embodiments thereof with reference to the attached drawings, in which.

DETAILED DESCRIPTION OF THE EMBODIMENTS

Out-of-band emission (OOBE) may be largely generated due to an orthogonal frequency-division multiplexing (OFDM) signal generating process and/or nonlinearity of a power amplifier (PA).

First, the OOBE generated in the OFDM signal generating process will be described. OFDM has high spectral efficiency by using orthogonality in a frequency domain, and is effective for channel fading. However, the OFDM has a large side lobe by each sub-carrier signal, which may cause the OOBE. Spectrum shaping filtering, guard band insertion, and/or precoding techniques at a transmitting end in a transceiver may be performed for generating a transmission signal to prevent OOBE generated in the OFDM signal generating process.

Then, the OOBE generated due to a power amplifier will be described. The nonlinearity of the power amplifier may be offset using a digital pre-distortion (DPD) technique to prevent OOBE generated due to the power amplifier. However, the digital pre-distortion technique uses the inverse of a power amplifier response, and requires calculation or calibration of the inverse according to the power amplifier connected to each transmitting end.

An adaptive filter may be used as a potential OOBE removal technology. A signal flowing into an adjacent channel needs to be removed up to a noise level to prevent OOPE. An adaptive filter may use an algorithm for tracking a time invariant filter coefficient. However, when OOBE is considered at a receiving end in a transceiver, nonlinearity may occur due to a difference between an up-converted frequency of a transmitting end and a down-converted frequency of the receiving end since a value may change over time.

In addition, a nonlinearity effect due to the power amplifier has also an influence on a signal at the receiving end, and accordingly, the effect of the power amplifier needs to be removed through modeling.

In a transceiver according to an embodiment of the present disclosure, which is one transceiver including a transmitting end and a receiving end having different frequency bands, a method of removing OOBE using a signal reflecting information on a difference between a frequency transmitted from the transmitting end and a frequency received from the receiving end in a transmission signal or transmission data with a basis function of an adaptive filter is proposed.

In particular, a transceiver according to an embodiment having an improved convergence speed and better performance at a convergence value using an Itô-Hermite polynomial having orthogonality between orders of the basis function when data transmitted from the transmitting end has a Gaussian distribution as a statistical characteristic of the data, as the basis function of the adaptive filter in the present disclosure, will be described.

Figure 1:
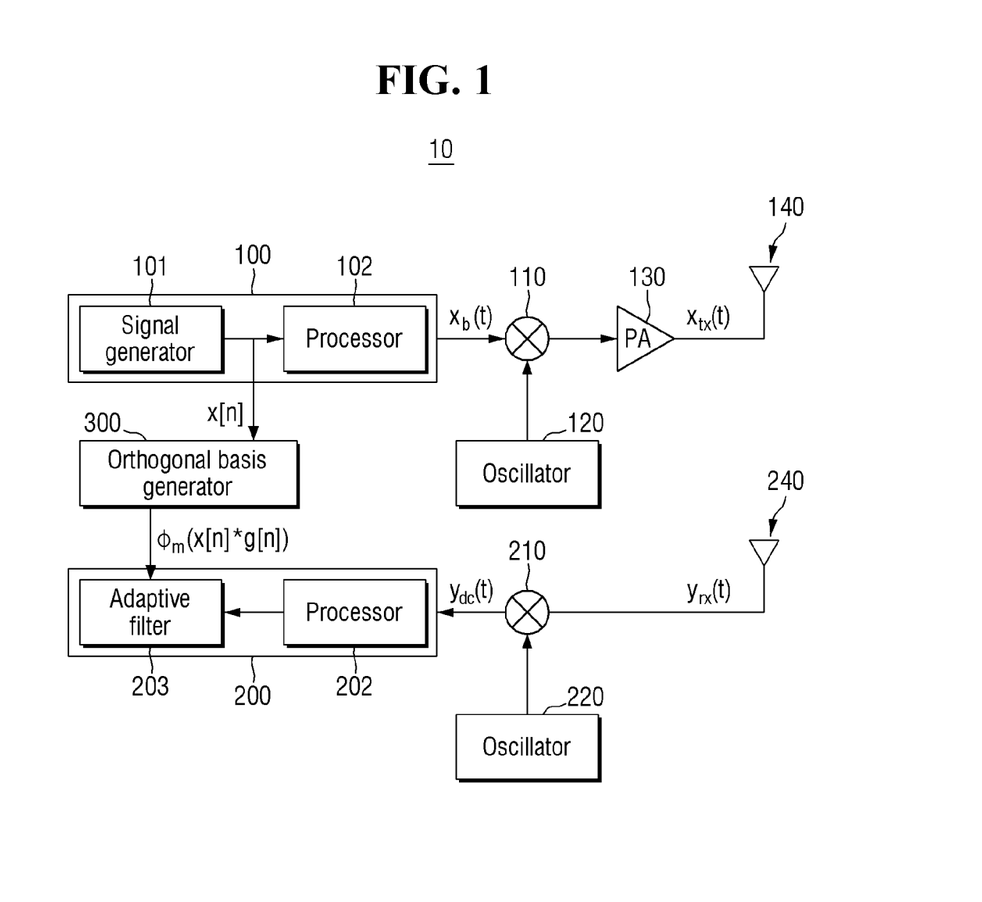
FIG. 1 is a diagram for describing a transceiver according to an exemplary embodiment.

FIG. 1 is a diagram for describing a transceiver according to an exemplary embodiment.

Referring to FIG. 1, a transceiver 10 according to an exemplary embodiment includes a transmitting end and a receiving end. The transmitting end includes a transmitter 100, a multiplier 110, a power amplifier (PA) 130, an oscillator 120, and a transmitting antenna 140. The receiving end includes a receiver 200, a multiplier 210, an oscillator 220, and a receiving antenna 240; and an orthogonal basis generator 300. The multiplier 110 may be implemented by a logic circuit.

The transmitter 100 includes a signal generator 101 generating data x[n] and a processor 102 performing pulse shaping on the data x[n].

The transmitter 100 may pulse-shape the data (x[n]) according to Equation 1.

$$x_p[n] = (g_t * x)[n] = \Sigma_{l=0}^{L} g_t[l] x[n-l], \quad x_b(t) = \Sigma_n x_p[n] \text{sinc}(Wt-n)$$ [Equation 1].

In Equation 1, $g_t[\ ]$ is a pulse shaping filter function, W is a bandwidth, $x_p$ is a discrete signal of the pulse-shaped data, and $x_b[\ ]$ is a continuous signal of the pulse-shaped data.

The data $x_b(t)$ pulse-shaped through the transmitter 100 may be transferred to the multiplier 110. The multiplier 110 may up-sample the pulse-shaped data $x_b(t)$ using an output of the oscillator 120, and the up-sampled data may be amplified to amplified data $x_{tx}(t)$ as expressed in Equation 2 through the power amplifier 130.

$$x_{tx}(t) = f_{PA}(\text{Real}(x_b(t) e^{-j2\pi f_{up} t}))$$ [Equation 2].

In Equation 2, $f_{PA}$ is an operation function of the power amplifier 130, and an ideal power amplifier may have characteristics of a linear function with a gain of G, such as $f_{PA}(x) = Gx$. $f_{up}$ may be a frequency up-converted or upscaled from a frequency of data x[n].

The amplified data $x_{tx}(t)$ may be transmitted to the receiving antenna 240 via a channel (e.g., a wireless channel) through the transmitting antenna 140. In this case, it is assumed that the channel is wide enough to track a channel coherence time in which an influence of the channel does not significantly change for a predetermined time. The transmitter 100, the multiplier 110, the oscillator 120, and the power amplifier 130 may together perform an OFDM operation.

The amplified data $x_{tx}(t)$ transmitted through the channel may include noise. Data $y_{rx}(t)$ received under an influence of the noise may be expressed in a convolutional form as in Equation 3.

$$y_{rx}(t) = (h * x_{tx})(t) + v(t)$$ [Equation 3].

In Equation 3, h is a channel, and v is a white Gaussian noise signal. An average of the white Gaussian noise signals may be 0, and a variance value may be determined depending on a magnitude of a noise level.

To emphasize nonlinearity due to a difference between the up-converted frequency $f_{up}$ and a down-converted (or downscaled) frequency, a delay channel ($hd(t) = \delta(t - t_0)$) may be assumed. In addition, assuming an ideal power amplifier, the received data ($y_{rx}(t)$) received through the receiving antenna 240 according to Equation 3 may be converted into data $y_{dc}(t)$ having a down-converted frequency through the multiplier 210 and an output of the oscillator 220. For example, a downscaling or a down-converting may be performed to convert the received data. The data $y_{dc}(t)$ having the down-converted frequency $f_{dw}$ may be generated through Equation 4. In an embodiment, the down-converted frequency $f_{dw}$ and the up-converted frequency $f_{up}$ are different from each other.

$$y_{dc}(t) = y_{rx}(t) e^{j2\pi f_{dw} t}$$ [Equation 4].

The data $y_{dc}(t)$ having the down-converted frequency $f_{dw}$ may include a portion having no frequency information and a portion having a frequency twice the up-converted frequency $f_{up}$, as expressed in Equation 5. In this case, in Equation 5, it is assumed that the down-converted frequency $f_{dw}$ and the up-converted frequency $f_{up}$ are the same as each other.

$$\begin{aligned}y_{dc}(t) &= (h_d(t) \star \text{Real}(x_b(t) e^{j2\pi f_{up} t})) e^{-j2\pi f_{up} t} = \\ &\delta(t-t_0) \star \text{Real}(x_b(t) e^{j2\pi f_{up} t}) e^{-j2\pi f_{up} t} = (x_b^I(t-t_0)\cos(2\pi f_{up}(t-t_0)) - \\ &x_b^Q \sin(2\pi f_{up}(t-t_0)))(\cos(2\pi f_{up} t) - j\sin(2\pi f_{up} t)) = \\ &\left(\frac{x_b^I(t-t_0)}{2} + j\frac{x_b^Q(t-t_0)}{2}\right)(\cos(-2\pi f_{up} t_0) + j\sin(-2\pi f_{up} t_0)) + \\ &\left(\frac{x_b^I(t-t_0)}{2} - j\frac{x_b^Q(t-t_0)}{2}\right)(\cos(2\pi(2f_{up})t - 2\pi f_{up} t_0) - \\ &j\sin(2\pi(2f_{up})t - 2\pi f_{up} t_0)) = \frac{x_b(t-t_0)}{2} e^{j(2\pi f_{up}(-t_0))} + \\ &\frac{x_b^*(t-t_0)}{2} e^{-j(2\pi(2f_{up})t - 2\pi f_{up} t_0)} = \\ &e^{j(2\pi f_{up}(-t_0))} \delta(t-t_0) \star \left(\frac{x_b(t)}{2} + \frac{x_b^*(t)}{2} e^{-j2\pi(2f_{up})t}\right)\end{aligned}$$ [Equation 5]

In Equation 5, $x_b^I(t), x_b^Q(t)$ indicates a real number part and an imaginary number part of $x_b(t)$, respectively, and $x_b^*(t)$ indicates a complex conjugate of $x_b(t)$.

Referring to Equation 5, the down-converted data $y_{dc}(t)$ is expressed in the form of a convolution of the delay channel multiplied by a constant and a transmission signal. When this signal passes through a low pass filter, the transmission signal may remain.

On the other hand, when the up-converted frequency $f_{up}$ and the down-converted frequency $f_{dw}$ are different from each other, the data $y_{dc}(t)$ having the down-converted frequency $f_{dw}$ may be expressed through Equation 6.

$$y_{dc}(t) = (h_d(t) \star \text{Real}\,(x_b(t)e^{j2\pi f_{up}t}))e^{-j2\pi f_{dw}t} = \qquad [\text{Equation 6}]$$

$$\delta(t-t_0) \star \text{Real}\,(x_b(t)e^{j2\pi f_{up}t}))e^{-j2\pi f_{dw}t} = (x_b^I(t-t_0)\cos(2\pi f_{up}(t-t_0)) -$$

$$x_b^Q \sin(2\pi f_{up}(t-t_0)))(\cos(2\pi f_{dw}t) - j\sin 2\pi f dwt =$$

$$\left(\frac{x_b^I(t-t_0)}{2} - j\frac{x_b^Q(t-t_0)}{2}\right)(\cos(2\pi(f_{up}+f_{dw})t - f_{up}t_0) -$$

$$j\sin(2\pi(f_{up}+f_{dw})t - fupt0 + xblt - t02 + jxbQt -$$

$$t02\cos 2\pi fup - fdwt - fupt0 + j\sin 2\pi fup - fdwt - fupt0 =$$

$$xbt - t02ej2\pi(fup - fdwt - fupt0) +$$

$$xb*t - t02e - j2\pi(fup + fdwt - fupt0) =$$

$$e^{-j2\pi f_{dw}t_0}\delta(t-t_0) \star \left(\frac{x_b(t)}{2}e^{j2\pi(f_{up}-f_{dw})t} + \frac{x_b^*(t)}{2}e^{-j2\pi(f_{up}+f_{dw})t}\right)$$

Through Equation 6, it may be confirmed that when the up-converted frequency $f_{up}$ and the down-converted frequency $f_{dw}$ are different from each other, a time variant signal by a frequency difference and a frequency sum exists.

The data $y_{dc}(t)$ having the down-converted frequency $f_{dw}$ is transmitted to the receiver 200.

The data $y_{dc}(t)$ having the down-converted frequency $f_{dw}$ may be pulse-shaped through a processor 202, and may then be transmitted to an adaptive filter 203.

The adaptive filter 203 may receive an orthogonal basis generated from the orthogonal basis generator 300 to track an unknown system parameter to be described later.

In this case, the orthogonal basis generator 300 may receive the data x[n] generated from the transmitter 100, more specifically, the signal generator 101, and generate the orthogonal basis $\Phi_m(x)$ from the received data x[n]. The generation of the orthogonal basis $\Phi_m(x)$ will be described in detail with reference to FIG. 2.

Figure 2:
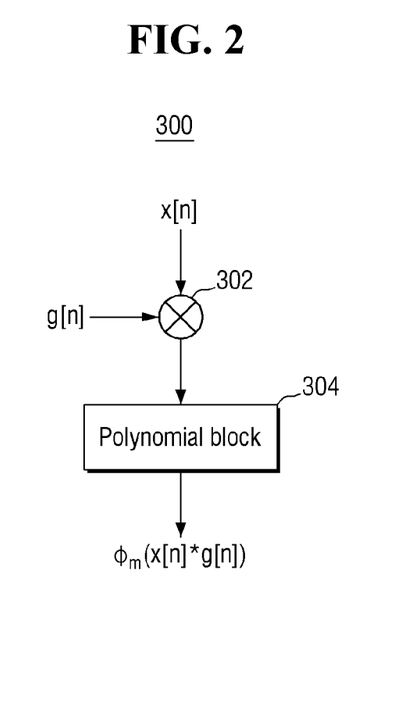
FIG. 2 is a diagram for describing an orthogonal basis generator according to an exemplary embodiment.

FIG. 2 is a diagram for describing an orthogonal basis generator according to an exemplary embodiment.

Referring to FIGS. 1 and 2, it can be seen that the data x[n] approaches a Gaussian distribution as a size of fast Fourier transform (FFT) increases, through inverse fast Fourier transform (IFFT) through the transmitter 100, as expressed in Equation 7.

$$x[n] = \frac{1}{N}\sum_{k=0}^{N-1} x_F[k]e^{j2\pi(n/N)k}. \qquad [\text{Equation 7}]$$

In Equation 7, N is a size of the FFT, and $x_F$ is a signal in a frequency domain of the data x[n].

In this case, a basis used in an Itô-Hermite polynomial may have the form of a polynomial as expressed in Equation 8.

$$\Psi_m(X) = |x|^{2m-1}x \qquad [\text{Equation 8}].$$

In this case, when the input data x[n] for the polynomial follows a Gaussian distribution as expressed in Equation 9, the respective orders may have orthogonality as expressed in Equation 10.

$$\Phi_m(x) = \sum_{k=0}^{\frac{m-1}{2}} (-1)^i i! \binom{\frac{m+1}{2}}{i}\binom{\frac{m-1}{2}}{i} x|x|^{m-1-2i} \qquad [\text{Equation 9}]$$

$$E\{\Phi_m(x)\Phi_{m'}^*(y)\} = \qquad [\text{Equation 10}]$$

$$\left(\frac{m+1}{2}\right)!\left(\frac{m-1}{2}\right)!E\{xy^*\}|E\{xy^*\}|^{m-1}\delta[m-m'].$$

In particular, when OFDM signals are transformed into time domain signals by an inverse Fourier transform as expressed in Equation 7, the OFDM signals may be expressed as the sum of frequency domain signals.

In particular, when Equation 7 is considered from a statistical point of view, in a case where a value of N becomes large, the data x[n] approaches the Gaussian distribution by a central limit theorem.

In the present disclosure, the OFDM signals are used at the transmitting end, and when the Itô-Hermite polynomial is used, the respective orders may have near orthogonality. When the basis of the polynomial as described above is used, nonlinearity of a system including the transceiver 10 may be tracked with the adaptive filter 203, and the OFDM signals have near orthogonality by passing through a basis function, and thus, a convergence speed and performance may be improved.

Specifically, the orthogonal basis generator 300 receives the data x[n], and multiplies the data x[n] by a Gaussian characteristic value g[n] obtained by extracting a Gaussian characteristic from the data x[n] through a multiplier 302. For example, the Gaussian characteristic value g[n] may be expressed as in Equation 11.

$$g[n] = e^{j2\pi(\Delta f/BW)n} \qquad [\text{Equation 11}]$$

In Equation 11, BW is a bandwidth.

The product of the generated data x[n] and the Gaussian characteristic value g[n] through the multiplier 302 may be transmitted to a polynomial block 304 to become an input to the Itô-Hermite polynomial of Equation 9. The polynomial block 304 may be implemented by a logic circuit.

Therefore, an orthogonal basis $\Phi_m(x[n]*g[n])$ of Equation 9 may be generated.

In this case, an orthogonal basis as expressed in Equation 12 (EQ12) may be generated by using an influence generated due to a difference between the up-converted frequency $f_{up}$ and the down-converted frequency $f_{dw}$ as an input to the Itô-Hermite polynomial.

$$\Phi_m\left(x[n]e^{j2\pi\frac{(f_{up}-f_{dw})}{BW}n}\right) = \Phi_m(x_{OOBE}[n]), \qquad [\text{EQ12}]$$

$$x_{OOBE}[n] = x[n]e^{j2\pi\frac{(f_{up}-f_{dw})}{BW}n}$$

The orthogonal basis generated by the orthogonal basis generator 300 may be used in the adaptive filter 203.

Figure 3:
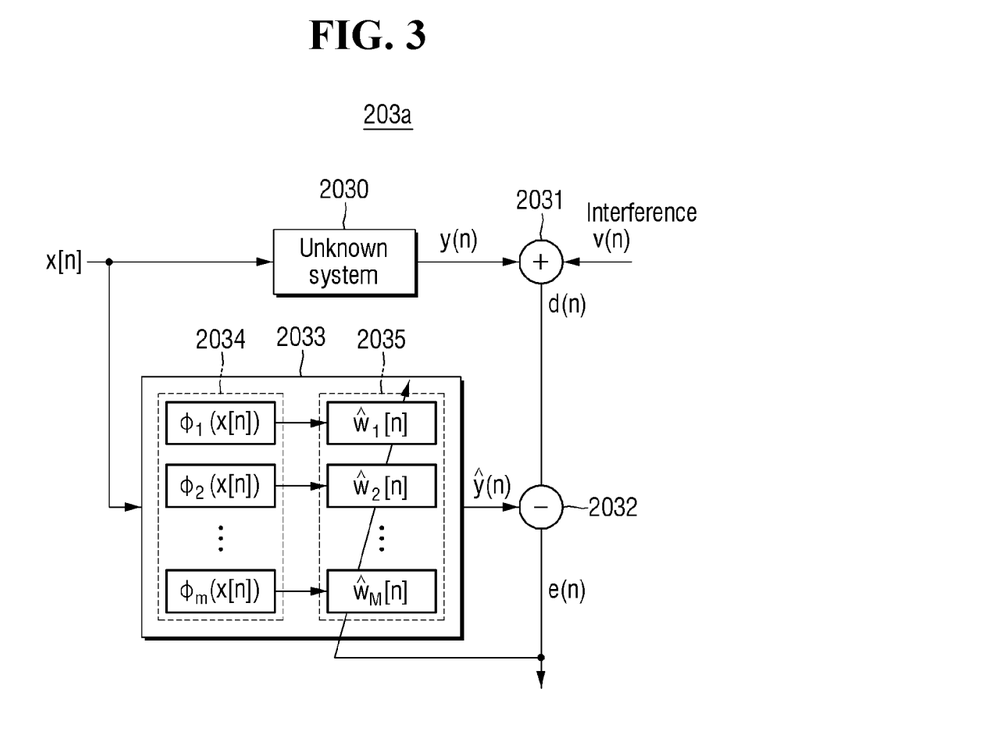
FIGS. 3 and 4 are illustrative diagrams for describing an adaptive filter according to an exemplary embodiment.
Figure 4:
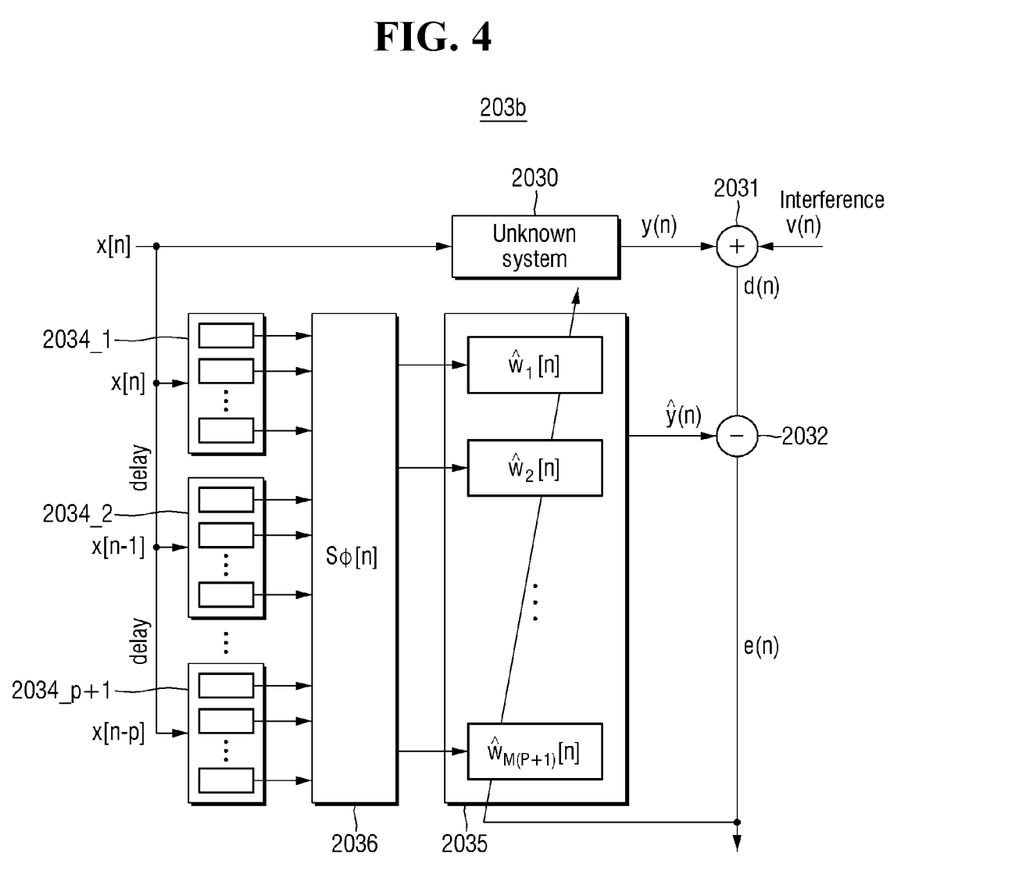

FIGS. 3 and 4 are illustrative diagrams for describing an adaptive filter according to an exemplary embodiment.

First, referring to FIGS. 1 to 3, an unknown system parameter for an unknown system 2030 may be tracked through an adaptive filter 203a. The adaptive filter of FIG. 1 may be implemented with the adaptive filter 203a.

For example, when the number of taps of the adaptive filter 203a is p, a vector x[n]=[x[n], x[n−1], . . . x[n−p+1]]H of input data x[n] of an n-th time and d[n](=y[n]+v[n]) in which noise or interference is added to an output signal y[n] of the unknown system 2030 may be required.

The adaptive filter 203a may output an output signal ŷ[n] through a block 2033 in which ŵ[n]=[ŵ$_0$[n], ŵ$_1$[n], ... ŵ$_{p-1}$[n]]$^H$ generated through an estimated weight filter 2035 is multiplied by orthogonal bases ($\Phi_1$(x[n]), $\Phi_2$(x[n]), to $\Phi_m$(x[n])) 2034 received from the orthogonal basis generator 300.

In this case, a difference between an estimated output signal ŷ[n] of the unknown system 2030 and an actual signal d(n) of the unknown system 2030 may be defined as an error e[n].

In this case, the adaptive filter 203a needs to decrease the square ($\|e[n]\|^2$) of a magnitude of an error, which is a cost function (C[n]). The adaptive filter 203a may decrease the square ($\|e[n]\|^2$) of the magnitude of the error through Equation 13 based on steepest descent.

$$e[n] = d[n] - ŷ[n] = d[n] - ŵ^H[n]x[n] \quad \text{[Equation 13]}$$

$$C[n] = E\{\|e[n]\|^2\}$$

$$\nabla_{ŵ^H} C[n] = 2E\{\nabla_{ŵ^H} e[n]e^*[n]\}$$

$$\nabla_{ŵ^H} e[n] = -x[n]$$

$$\hat{E}\{x[n]e^*[n]\} = \frac{1}{N}\sum_{k=0}^{N-1} x[n-i]e^*[n-i] = x[n]e^*[n],$$

$$(N = 1)$$

$$ŵ^H[n+1] = ŵ^H[n] - \frac{\mu}{2}\nabla_{ŵ^H} C[n]$$

$$ŵ^H[n+1] = ŵ^H[n] + \frac{\mu}{2}x[n]e^*[n]$$

In Equation 13, E{•} is an expected value, and μ is a step size of the steepest descent and may have an influence on a convergence speed of least mean square (LMS).

Equation 13 has an expected value in a gradient of the cost function, but a calculation may be performed using an empirical expected value. For example, a case where N=1, which is the simplest case of calculating an empirical expected value, may be considered.

As described above, by using an orthogonal basis having linearity as a basis for the least mean square, tracking efficiency for the unknown system parameter may be increased.

Referring to FIGS. 1, 2, and 4, an adaptive filter 203b may perform parameter tracking for an unknown system 2030 including a time variant system. The adaptive filter 203 of FIG. 1 may be implemented by the adaptive filter 203b.

For example, in consideration of a non-linear time delay of the power amplifier 130 as expressed in Equation 14, when the Itô-Hermite polynomial is used, whitening (or noise whitening) may be performed through a covariance block 2036 performing a covariance matrix operation on a time sample and an estimated weight filter 2035.

$$f_{PA}(x[n]) = \sum_{m=1,odd}^{M}\sum_{q_1=0}^{Q_1}\sum_{q_2=0}^{Q_2} d_{mq_1q_2} x[n-q_1]|x[n-q_2]|^{m-1} \quad \text{[Equation 14]}$$

The adaptive filter 203b may use orthogonal bases ($\Phi_1$(x[n]), $\Phi_2$(x[n]), to $\Phi_m$(x[n]))) 2034_1 to 2034_p+1 for each of delayed data x[n] to x[n−p].

For example, a cubic Itô-Hermite polynomial of the delayed data x[n] to x[n−p] may calculate empirical covariance using vectors in which data on delay times are accumulated as expressed in Equation 15, a whitening matrix as expressed in Equation 16 and a whitening method using the whitening matrix may be applied in order to decrease correlation according to the delayed data x[n] to x[n−p].

$$\Phi_{3,P}[n] = [\Phi_3(x_{OOBE}[n]), \quad \text{[Equation 15]}$$
$$\Phi_3(x_{OOBE}[n-1]), \dots, \Phi_3(x_{OOBE}[n-P])]^T$$

$$\sum\nolimits_\beta = E[\Phi_{3,P}[n]\Phi_{3,P}[n]^H] \simeq \frac{1}{N}\sum_{n=0}^{N-1}\Phi_{3,P}[n]\Phi_{3,P}[n]^H \quad \text{Equation 16}$$

$$\sum\nolimits_\beta = VDV^H \quad \text{[Equation 16]}$$

$$S = D^{-1/2}V^H$$

$$\overline{\Phi_{3,P}}[n] = S\Phi_{3,P}[n]$$

$\Phi_{3,P}$[n] of Equation 15 is a vector of delay times having a cubic Itô-Hermite polynomial, and empirical covariance using a time of n according to a system including the transceiver 10 may be used as the covariance.

In addition, Equation 16 may represent a method of generating a whitening matrix S by using an eigen value decomposition of the covariance of Equation 15 and a method of generating a new basis $\overline{\Phi_{3,P}}$[n] with low correlation from the whitening matrix.

A correlation coefficient according to a time may be decreased with reference to the example as described above, and in particular, covariance according to each time may have the form of a block diagonal matrix using the fact that a correlation between respective orders is close to 0 when an Itô-Hermite polynomial having orthogonality between the orders is used, and the block diagonal matrix may have a complexity gain as compared with a matrix of the same size.

Figure 5:
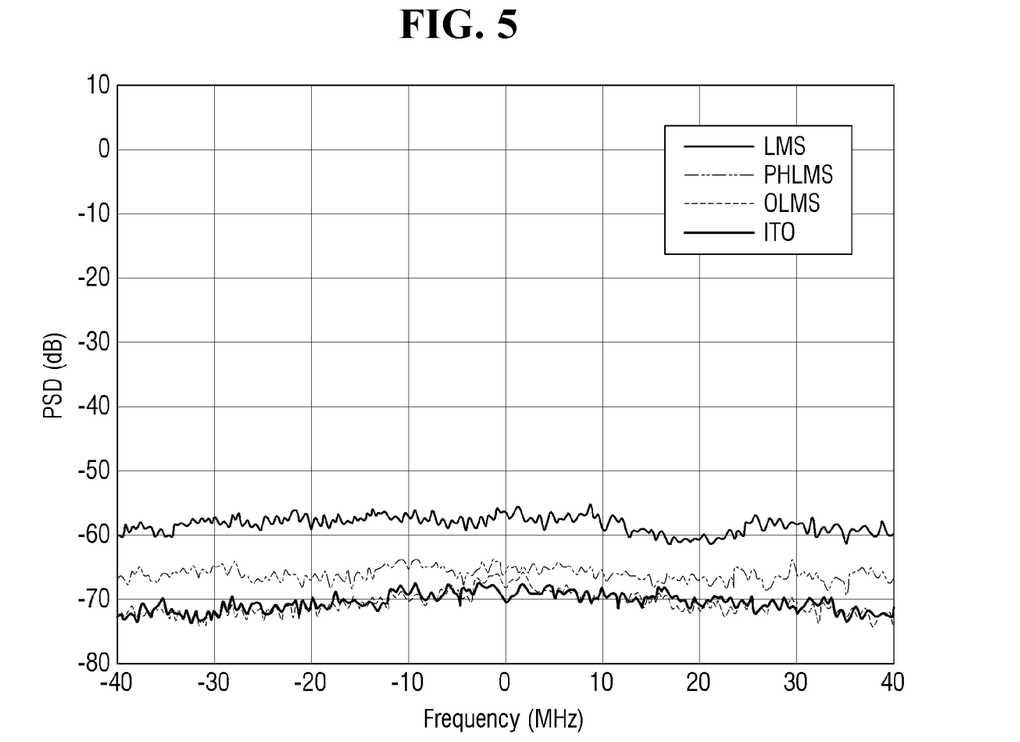
FIG. 5 is illustrative graphs illustrating power spectral densities (PSDs) of the transceiver according to an exemplary embodiment.

FIG. 5 includes graphs illustrating power spectral densities (PSDs) of the transceiver according to an exemplary embodiment.

Referring to FIG. 5, PSD graphs according to a frequency are illustrated.

It can be seen that power spectral density (PSD) characteristics are improved when the adaptive filter uses the LMS using the Itô-Hermite polynomial using the orthogonal basis described above with reference to FIGS. 1 to 4 than when the adaptive filter uses least mean square (LMS), parallel Hammerstein model LMS (PHLMS), and orthogonal LMS (OLMS).

Figure 6:
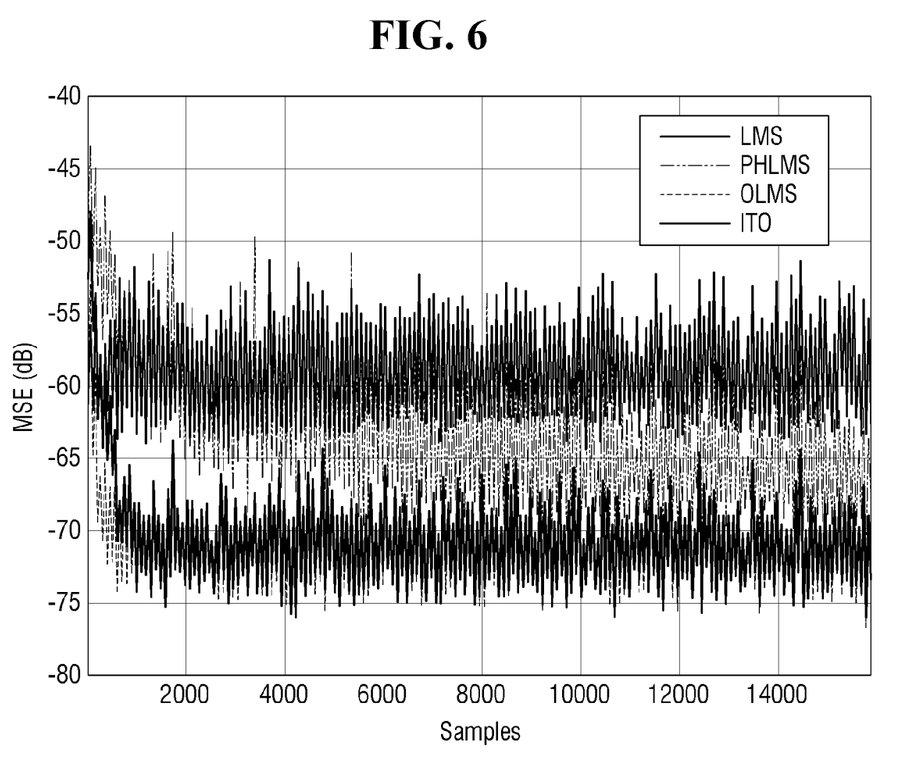
FIG. 6 is illustrative graphs illustrating a mean square error (MSE) of the transceiver according to an exemplary embodiment.

FIG. 6 includes graphs illustrating a mean square error (MSE) of the transceiver according to an exemplary embodiment.

Referring to FIG. 6, mean square error (MSE) graphs according to data samples of a transmitter are illustrated.

It can be seen that mean square error (MSE) characteristics are improved more when the adaptive filter uses the LMS using the Itô-Hermite polynomial using the orthogonal basis described above with reference to FIGS. 1 to 4 than when the adaptive filter uses least mean square (LMS), parallel Hammerstein model LMS (PHLMS), and orthogonal LMS (OLMS).

Exemplary embodiments of the present disclosure have been described hereinabove with reference to the accompanying drawings, but the present disclosure is not limited to the above-described exemplary embodiments, and may be implemented in various different forms. For example, one of ordinary skill in the art to which the present disclosure pertains may understand that the present disclosure may be implemented in other specific forms without changing the technical spirit of the present disclosure.

What is claimed is:

1. A transceiver comprising:
   a transmitter up-converting a frequency of input data to transmit data of a first frequency;

an orthogonal basis generator receiving the input data from the transmitter to generate an orthogonal basis; and a receiver receiving the orthogonal basis from the orthogonal basis generator and receiving the transmitted data for down-converting a frequency of the received data to a second frequency different from the first frequency, wherein the orthogonal basis generator comprises:

a multiplier multiplying the input data by a Gaussian characteristic value obtained by extracting a Gaussian characteristic of the input data to generate an out of band emission (OOBE) value; and a polynomial block generating the orthogonal basis by using the OOBE value as an input to an Itô-Hermite polynomial.

2. The transceiver of claim 1, wherein the Gaussian characteristic value uses a difference between the first frequency and the second frequency.

3. The transceiver of claim 1, wherein the transmitted data is generated through orthogonal frequency-division multiplexing (OFDM).

4. The transceiver of claim 1, wherein the receiver includes an adaptive filter receiving the orthogonal basis, and the adaptive filter includes an estimated weight filter generating an estimated system output signal using the orthogonal basis.

5. The transceiver of claim 4, wherein the adaptive filter generates an error by calculating a difference between the estimated system output signal and a target signal.

6. The transceiver of claim 1, wherein the transmitted data has a time delay, the receiver includes an adaptive filter receiving the orthogonal basis, and the adaptive filter comprises:

a covariance block performing a covariance matrix operation on a plurality of time-delayed data of the received data; and an estimated weight filter generating an estimated system output signal using a covariance output generated through the covariance block and an estimated weight filter.

7. The transceiver of claim 6, wherein the covariance block performs whitening through the covariance matrix operation.

8. A transceiver up-converting a frequency of input data to transmit data of a first frequency, and down-converting the first frequency to a second frequency different from the first frequency and receiving data having the second frequency, comprising:

an orthogonal basis generator receiving the input data, wherein the orthogonal basis generator comprises:

a multiplier multiplying the input data by a Gaussian characteristic value obtained by extracting a Gaussian characteristic of the input data to generate an out of band emission (OOBE) value; and a polynomial block generating the orthogonal basis by using the OOBE value as an input to an Itô-Hermite polynomial.

9. The transceiver of claim 8, wherein the Gaussian characteristic value uses a difference between the first frequency and the second frequency.

10. The transceiver of claim 8, wherein the transmitted data is generated through orthogonal frequency-division multiplexing (OFDM).

11. The transceiver of claim 8, further comprising an adaptive filter receiving the orthogonal basis, wherein the adaptive filter includes an estimated weight filter generating an estimated system output signal using the orthogonal basis.

12. The transceiver of claim 11, wherein the adaptive filter generates an error by calculating a difference between the estimated system output signal and a target signal.

13. The transceiver of claim 8, wherein the transmitted data has a time delay, the transceiver further comprises an adaptive filter receiving the orthogonal basis, and the adaptive filter comprises:

a covariance block performing a covariance matrix operation on a plurality of time-delayed data of the transmitted data; and an estimated weight filter generating an estimated system output signal using a covariance output generated through the covariance block and an estimated weight filter.

14. The transceiver of claim 13, wherein the covariance block performs whitening through the covariance matrix operation.

15. An operating method of a transceiver, comprising:

up-converting, by a transmitter, a frequency of input data to transmit data of a first frequency;

generating, by an orthogonal basis generator, an orthogonal basis based on the input data received from the transmitter; and receiving, by a receiver, the orthogonal basis from the orthogonal basis generator and the transmitted data to downscale a frequency of the transmitted data to a second frequency different from the first frequency, wherein the generating of the orthogonal basis comprises:

multiplying the input data by a Gaussian characteristic value obtained by extracting a Gaussian characteristic of the input data to generate an out of band emission (OOBE) value, through a multiplier in the orthogonal basis generator; and generating the orthogonal basis by using the OOBE value as an input to an Itô-Hermite polynomial, through a polynomial block in the orthogonal basis generator.

16. The operating method of a transceiver of claim 15, wherein the Gaussian characteristic value uses a difference between the first frequency and the second frequency.

17. The operating method of a transceiver of claim 15, wherein the transmitted data is generated through orthogonal frequency-division multiplexing (OFDM).

18. The operating method of a transceiver of claim 15, further comprising:

receiving the orthogonal basis through an adaptive filter in the receiver; and generating an estimated system output signal using the orthogonal basis through an estimated weight filter in the adaptive filter.

19. The operating method of a transceiver of claim 18, further comprising generating an error by calculating a difference between the estimated system output signal and a target signal through the adaptive filter.

20. The operating method of a transceiver of claim 15, wherein the transmitted data has a time delay, and the operating method of a transceiver further comprises:

receiving the orthogonal basis through an adaptive filter in the receiver;

performing a covariance matrix operation on a plurality of time-delayed data of the transmitted data through a covariance block in the adaptive filter; and generating an estimated system output signal using a covariance output generated through the covariance block, through an estimated weight filter in the adaptive filter.

* * * * *